Patented Mar. 16, 1948

2,437,906

UNITED STATES PATENT OFFICE 2,437,906

CYANOETHYLATION OF CARBONYLIC COMPOUNDS

Herman A. Bruson, Rydal, and Warren D. Niederhauser, Philadelphia, Pa., assignors to The Resinous Products & Chemical Company, Philadelphia, Pa., a corporation of Delaware No Drawing. Application January 3, 1946, Serial No. 638,918

3 Claims. (Cl. 260—464)

This invention deals with a process for cyanoethylating organic compounds having a reactive hydrogen atom on a carbon atom contiguous to a carbonyl group. More particularly this invention deals with the introduction of a cyanoethyl group on a carbon atom which is immediately adjacent to a carbonyl group by condensing ethylene cyanohydrin and a compound having a reactive methenyl, methylene, or methyl group immediately adjacent a carbonyl group. With greater particularity the present invention is directed to cyanoethylating ketonic or aldehydic bodies which have reactive hydrogen on the carbon atom in juxtaposition to the carbonyl group thereof.

Cyanoethylation has heretofore been accomplished by the addition of acrylonitrile to compounds having reactive hydrogen. The preparation of acrylonitrile usually requires dehydrating or dehydrohalogenating or other type of splitting-out of a group from a saturated molecule and handling of a reactive unsaturated compound. It is now found that in general the same end-result as to cyanoethylation may be accomplished by condensation with the saturated compound, ethylene cyanohydrin, in the presence of an alkaline catalyst at temperatures of about 80° C. to about 110° C.

The reaction may be formulated as follows, an aldehyde being shown by way of example,

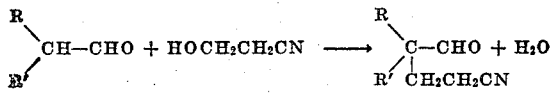

If more than one reactive hydrogen atom is present on the carbon atom contiguous to the carbonyl group, each such hydrogen may be replaced by a —CH₂CH₂CN group, thus

R—CH₂—COCH₃ + HOCH₂CH₂CN ⟶

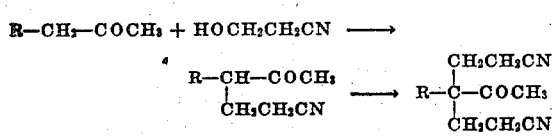

The reaction is widely applicable to compounds having reactive hydrogen atoms on the carbon atom contiguous to a carbonyl group. It is particularly applicable to aldehydes and ketones, such as isobutyraldehyde, 2-ethyl hexaldehyde, ethyl amyl acetaldehyde, diethyl acetaldehyde, phenyl acetaldehyde, cyclohexyl acetaldehyde, phenoxyacetaldehyde, butyraldehyde, propionaldehyde, or other aldehydes of at least two carbon atoms, and preferably four carbon atoms, free of interfering acidic groups, or cyclopentanone, cyclohexanone, cycloheptanone, acetone, cyanoacetone, ethoxyacetone, phenoxyacetone, acetophenone, p-methyl acetophenone, acetyl tetrahydronaphthalene, p-chloroacetophenone, methyl ethyl ketone, methyl propyl ketone, and higher homologues thereof, acetoacetic esters, benzoyl acetic esters, etc.

Typical alkaline catalysts which may be used include the oxides, hydroxides, amides, hydrides, and alcoholates of the alkali-metals, the strongly basic quaternary ammonium hydroxides, such as dimethyl dibenzyl ammonium hydroxide and trimethyl benzyl ammonium hydroxide, and strongly alkaline salts of weak acids such as sodium cyanide. The quantity of catalyst used need be only 0.5% to 5% of the weight of the reactants.

The reaction is desirably performed in the presence of a solvent which permits removal of water of condensation azeotropically, benzene, toluene, solvent naphthas, and chlorinated solvents being useful. After separation of water no longer progresses, the alkaline catalyst may be destroyed by addition of an acidic substance and the product separated, as by distillation.

The following examples illustrate the invention.

Example 1

A mixture of 0.5 mol of ethylene cyanohydrin, 0.7 mol of 2-ethylbutyraldehyde and 5 cc. of 30% methanolic potassium hydroxide was heated to boiling beneath a reflux condenser which was attached to a water trap to remove the water formed during the reaction. At the end of 15 minutes 4.3 g. of water had been collected. Toluene (12 cc.) was then added to the reaction mixture and refluxing was continued for 15 minutes until a total of 6 cc. of water had been given off. The product was cooled, acidified with dilute hydrochloric acid to Congo red indicator, washed twice with water, dried, and distilled to give 25 g. of 2-(beta-cyanoethyl)-2-ethylbutyraldehyde boiling at 118°–123° C. at 4 mm.

Example 2

A mixture of 0.5 mol of 2-ethylhexaldehyde, 0.5 mol of ethylene cyanohydrin, 75 cc. of benzene and 5 cc. of 30% methanolic potassium hydroxide was heated and stirred at 94°–96° C. under a reflux condenser attached to a water trap. After 70 minutes, 7.2 g. of water had been collected. The reaction mixture was made slightly acid with dilute hydrochloric acid, washed, dried, and distilled to give 2-(beta-cyanoethyl)-2-ethylhexaldehyde boiling at 131°–136° C. at 5 mm.

Example 3

A mixture of 0.5 mol of ethylene cyanohydrin, 2 mols of methyl propyl ketone, 100 cc. of benzene and 7 cc. of 30% methanolic potassium hydroxide solution was heated and stirred for one and one-half hours at 88° C. under a reflux condenser attached to a water trap. After 8 g. of water had been collected, the product was washed with water and dilute acid, filtered, and the filtrate distilled to give beta-cyanoethyl methyl propyl ketone

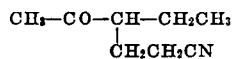

boiling at 90°–93° C. at 3 mm.

Example 4

A solution of 5 parts of 30% methanolic potassium hydroxide in 36 parts of methyl ethyl ketone was stirred at its boiling point under a reflux condenser while to it there was added dropwise during 15 minutes 71 parts of ethylene cyanohydrin. The reaction mixture was stirred on the steam bath under reflux for one and one-half hours, cooled, acidified to Congo red with 6 N hydrochloric acid, stirred with 5 parts of anhydrous sodium carbonate, filtered, and distilled in vacuo to give 18.5 parts of solid cyanoketone boiling at 170°–215° C. at 4 mm. After crystallization from benzene, it melted at 66°–67° C. and did not depress the melting point (67° C.) of an authentic sample of gamma-methyl-gamma-acetopimelonitrile.

Example 5

A mixture of 20 parts of tertiary butyl alcohol, 5 parts of 30% methanolic potassium hydroxide, 71 parts of ethylene cyanohydrin, and 24.5 parts of cyclohexanone was stirred and heated at 90°–105° C. under reflux for three hours. The product was cooled, diluted with acetone, and filtered. The precipitate was recrystallized from acetone to give white crystals, melting at 163–164° C., which did not depress the melting point of an authentic sample of tetracyanoethylcyclohexanone, M. P. 164°–165° C.

The products of this invention are useful as intermediates for the preparation of monocarboxylic and polycarboxylic acids, amides, and esters, amines, polyamines, amidines, aminoacids, or aminoalcohols through the usual reactions of the nitrile group. These compounds are of promise in connection with synthetic resins, plasticizers, insecticides, or textile finishing, and in other fields of application.

We claim:

1. A process of cyanoethylating a saturated aliphatic ketone having a reactive hydrogen on the carbon atom contiguous to the carbonyl group thereof and having three to five carbon atoms which comprises reacting by condensing together ethylene cyanohydrin and said ketone at about 80° C. to about 110° C. in the presence of 0.5% to 5% (based on the weight of the reactants) of an alkaline catalyst selected from a member of the class consisting of oxides, hydroxides, amides, hydrides, and alcoholates of the alkali metals and the strongly basic quaternary ammonium hydroxides.

2. The process of claim 1 in which a sodium alcoholate is used as the alkaline catalyst.

3. A process of preparing gamma-methyl-gamma-acetopimelonitrile which comprises reacting by condensing together ethylene cyanohydrin and methyl ethyl ketone at about 80° C. to about 110° C. in the presence of 0.5% to 5% (based on the weight of the reactants) of sodium alcoholate.

HERMAN A. BRUSON.
WARREN D. NIEDERHAUSER.

REFERENCES CITED

The following references are of record in the file of this patent:

UNITED STATES PATENTS

| Number | Name | Date |
|---|---|---|
| 2,353,687 | Bruson et al. | July 18, 1944 |
| 2,364,422 | Brooks | Dec. 5, 1944 |
| 2,375,005 | Kung | May 1, 1945 |
| 2,394,962 | Bruson | Feb. 12, 1946 |
| 2,403,570 | Wiest | July 9, 1946 |